United States Patent
Stille

(10) Patent No.: US 8,824,479 B2
(45) Date of Patent: Sep. 2, 2014

(54) METHOD AND APPARATUS FOR CONTROLLING TELECOMMUNICATION SERVICES

(75) Inventor: Mats Ola Stille, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 13/129,013

(22) PCT Filed: Nov. 13, 2008

(86) PCT No.: PCT/SE2008/051303
§ 371 (c)(1),
(2), (4) Date: May 12, 2011

(87) PCT Pub. No.: WO2010/056163
PCT Pub. Date: May 20, 2010

(65) Prior Publication Data
US 2011/0211575 A1 Sep. 1, 2011

(51) Int. Cl.
*H04L 12/28* (2006.01)
*H04L 29/06* (2006.01)
*H04M 3/38* (2006.01)

(52) U.S. Cl.
CPC ............ *H04L 63/0227* (2013.01); *H04M 3/38* (2013.01); *H04L 65/1016* (2013.01)
USPC ................. 370/395.2; 455/410; 455/414.1

(58) Field of Classification Search
None
See application file for complete search history.

(56) References Cited

U.S. PATENT DOCUMENTS

| | | | |
|---|---|---|---|
| 6,311,055 B1 | 10/2001 | Boltz | |
| 7,133,662 B2* | 11/2006 | Bravo et al. | 455/411 |
| 7,218,924 B2* | 5/2007 | McArdle | 455/418 |
| 7,373,137 B2* | 5/2008 | Lauridsen et al. | 455/410 |
| 7,715,823 B2* | 5/2010 | Bravo et al. | 455/411 |
| 7,796,973 B2* | 9/2010 | Lauridsen et al. | 455/410 |
| 2007/0015492 A1* | 1/2007 | Bravo et al. | 455/411 |
| 2007/0238449 A1* | 10/2007 | Park et al. | 455/417 |
| 2008/0102791 A1* | 5/2008 | Lauridsen et al. | 455/410 |
| 2009/0253406 A1* | 10/2009 | Fitzgerald et al. | 455/410 |
| 2009/0253410 A1* | 10/2009 | Fitzgerald et al. | 455/411 |
| 2010/0304704 A1* | 12/2010 | Najafi | 455/404.1 |

FOREIGN PATENT DOCUMENTS

| | | |
|---|---|---|
| EP | 1 775 922 A1 | 4/2007 |
| GB | 2 305 073 | 3/1997 |
| JP | 02-166953 | 6/1990 |
| JP | 06-253022 | 9/1994 |

(Continued)

OTHER PUBLICATIONS

International Search Report for PCT/SE2008/051303, mailed Apr. 28, 2009.

(Continued)

*Primary Examiner* — Michael J Moore, Jr.
(74) *Attorney, Agent, or Firm* — Nixon & Vanderhye P.C.

(57) ABSTRACT

Method and apparatus in a user terminal (200) for controlling the admission of outgoing communications. One or more communication admission rules (206a) are created locally in a communication admission controller (206) in the terminal, according to configuring input commands dictating when outgoing communications should be admitted or rejected. When an input unit (202) receives an input request from a current terminal user for an outgoing communication, the communication admission rules are checked. A communication request unit (210) sends a communication request message towards a used communication services network if the requested outgoing communication can be admitted according to the communication admission rules. Otherwise, a reject message is provided to the current terminal user.

10 Claims, 2 Drawing Sheets

(56) References Cited

FOREIGN PATENT DOCUMENTS

| WO | WO 99/18704 | 4/1999 |
| WO | WO 03/030579 | 4/2003 |
| WO | WO 03/103258 | 12/2003 |

OTHER PUBLICATIONS

Written Opinion of the International Searching Authority for PCT/SE2008/051303, mailed Apr. 28, 2009.
International Preliminary Report on Patentability with Three (3) Amended Sheets for PCT/SE2008/051303, dated Sep. 10, 2010.

* cited by examiner

METHOD AND APPARATUS FOR CONTROLLING TELECOMMUNICATION SERVICES

This application is the U.S. national phase of International Application No. PCT/SE2008/051303, filed 13 Nov. 2008, which designated the U.S., the entire content of which is hereby incorporated by reference.

TECHNICAL FIELD

The present invention relates generally to a method and arrangement for controlling calls and sessions initiated from a user terminal.

BACKGROUND

A multitude of different communication terminals and devices have been developed for packet-based multimedia communication using IP (Internet Protocol), such as fixed or mobile computers and telephones, which will be generally called "user terminals" here for short. Multimedia services typically involve transmission of media in different formats and combinations. For example, a user terminal may exchange audio information as well as visual information with another user terminal, or may download or stream media in any format from a content server.

An architecture called "IP Multimedia Subsystem" (IMS) has also been developed as a platform for enabling multimedia services and sessions, commonly referred to as an IMS network or IMS core. Thus, an IMS network can be used to initiate and control multimedia sessions for any IMS enabled user terminals connected to different access networks. Although conceived primarily to enable multimedia services for mobile terminals, the IMS concept can be used for fixed terminals as well.

Multimedia sessions are handled by specific session control nodes in the IMS network, also called CSCF (Call Session Control Function) nodes including P-CSCF (Proxy CSCF), S-CSCF (Serving CSCF) and I-CSCF (Interrogating CSCF). An IMS network further includes a database node HSS (Home Subscriber Server) for storing various subscriber and authentication data, and typically also includes various application servers for enabling the multimedia services.

The communication protocol called SIP (Session Initiation Protocol) is generally used by IMS networks for controlling multimedia services, thus being a signalling protocol for creating, modifying and terminating sessions over a packet-switched logic. An application server of an IMS network is therefore commonly referred to as a "SIP-AS".

FIG. 1 is a simplified schematic illustration of a basic network structure for providing multimedia services for a mobile terminal A by means of an IMS core 100. The terminal A is connected to a mobile access network 102 and communicates in a multimedia session with another terminal B which may be connected to the same access network 102 or another access network (not shown). The access network 102 is connected to IMS core 100 which comprises "CSCF nodes" 104 and a HSS 108. A plurality of application servers 106 are also attached to the IMS core 100.

Terminal A exchanges control messages with the IMS core 100 whereas data is communicated with terminal B over network 102 during the session, as shown in the figure. Terminal A may alternatively communicate with an external content server or the like, e.g. for downloading some multimedia content therefrom, or merely with one of the application servers 106.

The current standardised IMS services typically require the usage of a SIP-AS, including the services of MMTel (Multimedia Telephony) and IM (Instant Messaging). The full service logic of an IMS service is generally divided between the user terminal, the IMS core nodes and the SIP-AS. The user terminal is needed as a user interface and for basic application execution, and the IMS core nodes are used for finding and connecting terminals and servers with each other. The SIP-AS typically offers extra service logic beyond the basic services, e.g. supplementary services such as call barring.

However, IMS services can be fairly complex to accomplish and execute since several nodes are required as service logic points, e.g. the user terminals, core nodes, and various application servers such as the SIP-AS. Further, functionality in the nodes above and signalling there between are required for executing user-dependent control of services. No simple way has been described to avoid network processing and signalling when controlling outgoing calls for a terminal, e.g. if the terminal is shared by plural users where it may be desirable to differentiate the usage of the terminal.

EP 1775922 A1 discloses that a terminal user can configure a contact list in his/her terminal to bar incoming calls from certain calling parties.

WO 03/030579 discloses that when a base station receives a signal from a mobile terminal associated with a request for an outgoing communication, the base station checks rules in a database for the terminal to determine whether the outgoing communication can be allowed to go through.

WO 99/18704 discloses that a supplementary service (SS) database in an intelligence network (IN) node stores call barring data for controlling outgoing calls.

GB 2305073 discloses that a memory element in a mobile radio unit contains respective operational characteristics of a plurality of users. It is also briefly mentioned that the operational characteristics may include call barring details, among other things, without further description.

SUMMARY

It is an object of the present invention to address the needs and demands outlined above. Further, it is an object to provide a solution that enables user-dependent control of communication services. These objects and others may be obtained by providing a method and apparatus according to the independent claims attached below.

According to one aspect, a method is provided in a user terminal for controlling the admission of outgoing communications. In this method, one or more communication admission rules are created locally in the terminal according to configuring input commands dictating when outgoing communications should be admitted or rejected. When an input request is received from a current terminal user for an outgoing communication, the communication admission rules are checked in response to the received input request. A communication request message is then sent towards a used communication services network if the requested outgoing communication can be admitted according to the communication admission rules. Otherwise, a reject message is provided to the current terminal user.

According to another aspect, an apparatus is provided in a user terminal for controlling the admission of outgoing communications. This apparatus comprises a communication admission controller adapted to create one or more communication admission rules locally in the terminal according to configuring input commands dictating when outgoing communication requests should be admitted or rejected. The apparatus further comprises an input unit adapted to receive an input request from a current terminal user for an outgoing communication, and the communication admission controller is further adapted to check the communication admission rules in response to the received input request. The apparatus also comprises a communication request unit adapted to send a communication request message towards a used communication services network if the requested outgoing communication can be admitted according to the communication admission rules. The communication admission controller is further adapted to otherwise provide a reject message to the current terminal user if the requested outgoing communication cannot be admitted.

Different embodiments are possible in the method and apparatus in the user terminal above. In one embodiment, the communication admission rules are based on any of the following limitation factors separately or in combination: identity of current terminal user, location of current user, type of requested communication service, type of requested media, time of day, week or season, identity of called user, and location of called user.

In another embodiment, the communication admission rules require a correct password from the current user before allowing the outgoing communication. The communication admission rules may then dictate that the password is required depending on any one or more of: identity of current terminal user, type of requested communication service, type of requested media, time of day, week or season, identity of called user, location of current user, and location of called user.

In further embodiments, a service application in the terminal is activated by the input request and the communication admission controller then receives a service request notification signal from the service application in order to check the communication admission rules. The requested outgoing communication may involve any of: a voice call, a media session, messaging and/or an IMS transaction.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Figure 1:
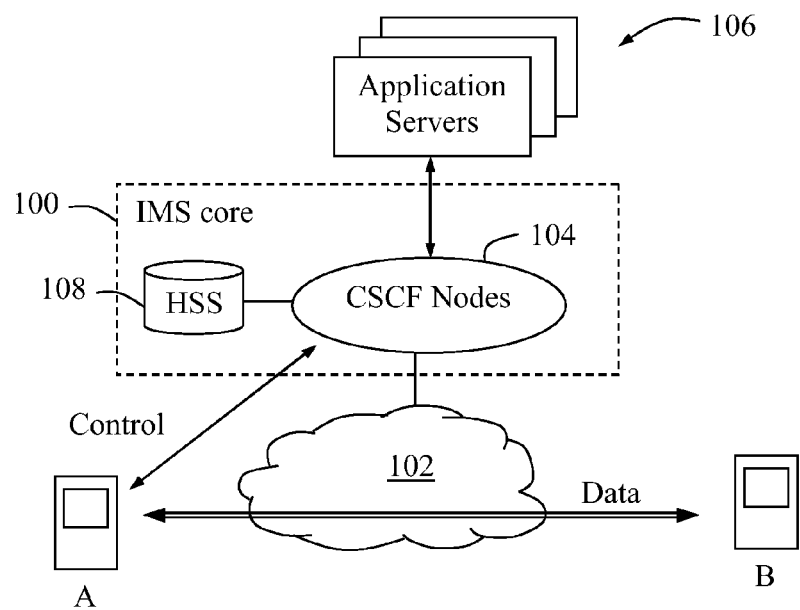
FIG. 1 is a schematic view illustrating a basic network structure for providing multimedia services, according to the prior art.

Briefly described, the present invention can be used for controlling the admission of calls, sessions and transactions initiated from a user terminal, without involving or requiring any network nodes such as the SIP-AS. Previously, outgoing requests for calls and other communication sessions have been controlled by network nodes, e.g. in the access network or IMS network used, typically the SIP-AS for IMS implemented services. An authorised terminal owner would then have to configure rules and policies in a call control node for controlling the admission of such outgoing communication requests, e.g. by setting parameters and options in a subscription or the like, typically also requiring procedures for registration and authentication with the call control node. Whenever a call request is sent from the terminal, the admission rules or policies valid for that terminal are checked in the call control node. If the call request cannot be admitted according to the rules or policies, it is rejected.

The involvement of network nodes such as the SIP-AS can be completely avoided by implementing a communication admission control function locally in the user terminal as follows. A person owning or being generally responsible for a terminal can then easily configure a set of communication admission rules, alternatively referred to as a communication admission policy, locally in the terminal in order to control the admission of outgoing communications or session requests. In this description, the term "outgoing communication" is used to represent any outgoing call, session or transaction involving communication of any media or message type(s), including voice calls, messaging and media sessions as well as transactions such as IMS transactions, e.g. a SIP MESSAGE. Further, the term "terminal owner" represents a person that is able to configure communication admission rules in the terminal, while a "terminal user" is any person that initiates a call, session or transaction from that terminal.

For example, the terminal owner may determine that one or more certain terminal users are only allowed to make voice calls but not multimedia sessions, e.g. at predetermined times of the day. In the case of a terminal shared in a company, it may be allowed to communicate written messages, e.g. SMS (Short Message Service) or IMS transactions, with a certain external party but not to make voice or video calls with that party. In further examples, a particular user may be allowed only to visit a limited set of servers or web sites, or to download specific media only, or may be forbidden to make certain calls or download certain media, and so forth. Thereby, usage of the terminal can be controlled and differentiated depending on any predetermined limitation factor(s), which can be useful, e.g., if the terminal is shared by plural users in an office or a family.

The terminal usage with respect to outgoing communications can thus be controlled by setting the communication admission rules in the terminal. The current terminal user may then be required to log on to the terminal for identification and proper application of the communication admission rules, e.g. by entering a password or similar. It is also possible to configure communication admission rules that require logon and identification only for certain call types or media services.

The terminal owner can thus configure any detailed communication admission rules locally in the terminal depending on any of the following limitation factors separately or in combination: identity of current terminal user, location of current user, type of requested communication service, type of requested media, time of day, week or season (e.g. out-of-office hours and weekends), identity of called user, location of called user, and so forth. Any of the above limitation factors can thus be combined when defining a communication admission rule. For example, messaging services or transactions may be allowed but not voice and video calls, for a certain user in communication with a certain opposite party during out-of-office hours 6 p.m.-9 a.m.

Figure 2:
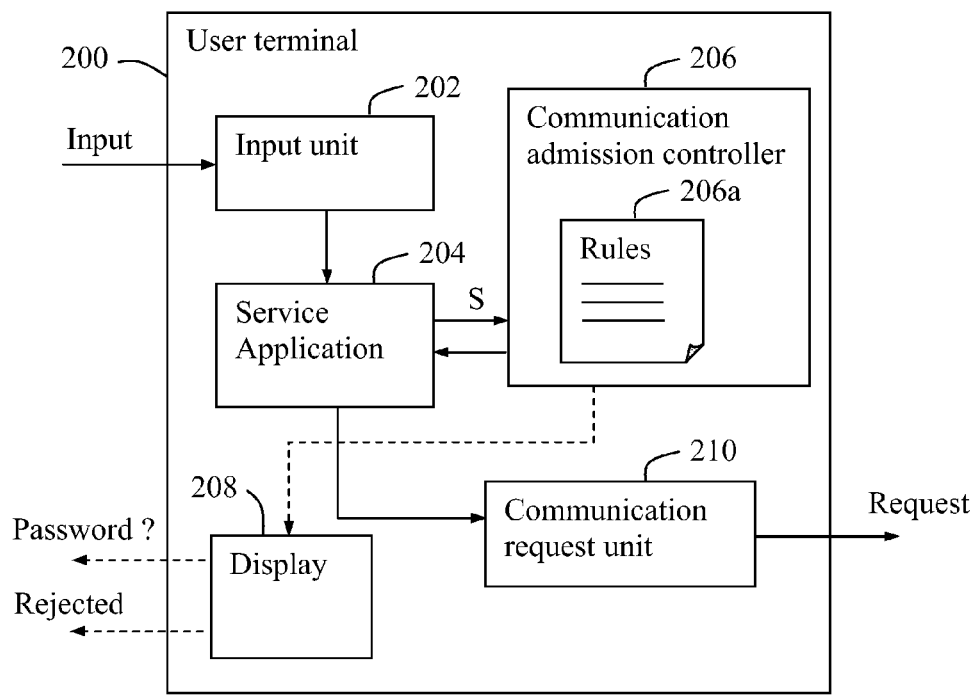
FIG. 2 is a block diagram of an arrangement in a user terminal for controlling the admission of outgoing communications, in accordance with one embodiment.

FIG. 2 is a block diagram illustrating an arrangement in a user terminal 200 for controlling the admission of outgoing communication requests. An input unit 202 is generally adapted to receive user input commands, e.g. by means of conventional push buttons or a keyboard. A service application 204 is adapted to enable a communication service in the terminal, e.g. a voice call or a multimedia service. Terminal 200 may typically comprise a plurality of different service applications to enable different services, although only a single service application 204 is shown here for simplicity. When an input command is received in the input unit 202 from a current terminal user for a communication service involving an outgoing communication, the service application 204 is activated to execute the service and initiate the communication, as shown by means of arrows.

The service application 204 is further adapted to provide a service request notification signal S to a communication admission controller 206. The notification signal S may be any internal or proprietary control message known by the terminal manufacturer, which is thus not necessary to standardize. The communication admission controller 206 comprises a set of communication admission rules 206a which have been configured by a terminal owner to control usage of the terminal with respect to outgoing communications, e.g. based on any one or more of the limitation factors exemplified above. Upon receiving the service request notification signal S, the communication admission controller 206 then checks the communication admission rules 206a to determine whether this particular requested outgoing communication can be admitted or not.

Depending on the implementation, the communication admission rules 206a may dictate that the outgoing communication can be admitted immediately, and service application 204 then activates a communication request unit 210 to send a communication request message towards a used communication services network, not shown, to initiate the communication. It should be noted that this is the first message sent from the terminal to the network, i.e. after the outgoing communication has been admitted locally in the terminal.

On the other hand, the communication admission rules 206a may require a password from the current user before allowing the outgoing communication. In that case, communication admission controller 206 returns a message such as "Enter password" to the current user displayed on a display unit 208, as shown by dashed arrows. If the user enters the proper password, service application 204 will activate the communication request unit 210 to send a communication request message towards the network to initiate the communication.

Alternatively, the communication admission rules 206a may dictate that the desired service, transaction or call is immediately rejected, and communication admission controller 206 accordingly returns a message such as "communication rejected" or the like to the user on display unit 208. In the case of requiring a password, communication admission controller 206 will provide the message "communication rejected" on display unit 208 if the current user fails to enter the correct password. In another example, if an entered proper password identifies a particular terminal user, the outgoing communication may be either admitted or rejected depending on what is dictated by the communication admission rules 206a for that particular user.

If the communication request is rejected according to any of the above examples, no signal or message whatsoever is issued from the terminal towards the network. It should be noted that FIG. 2 merely illustrates various functional units in the user terminal 200 in a logical sense. However, the skilled person is free to implement these functions in practice using any suitable software and hardware means. Thus, the present invention is generally not limited to the shown structure of the user terminal 200.

Figure 3:
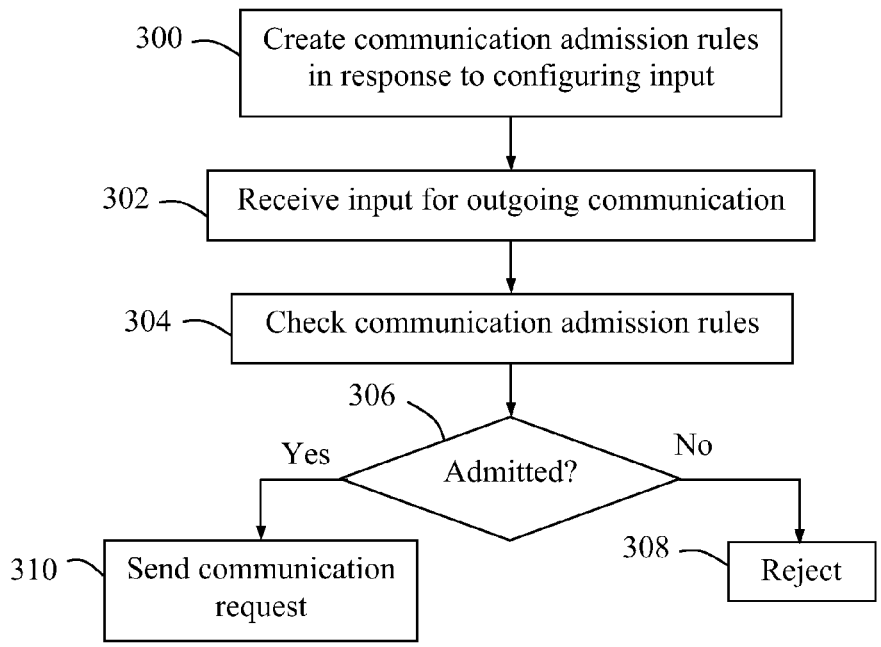
FIG. 3 is a flow chart illustrating a procedure for controlling the admission of outgoing communications, in accordance with another embodiment.

FIG. 3 illustrates steps in a procedure for controlling the admission of outgoing communications, as performed by a user terminal in accordance with another embodiment. In a first step 300, communication admission rules are created in response to a configuring input command or the like made by a terminal owner, i.e. a person that is able/authorised to configure such rules in the terminal. The communication admission rules may be stored in the communication admission controller 206 shown in FIG. 2, and may further be based on any limitation factor(s) such as described above.

In a next step 302, an input command requesting an outgoing communication is received from a current terminal user, e.g. in the input unit 202 in FIG. 2. The input command may activate a service application 204 as shown in FIG. 2. It is then checked whether the communication admission rules dictate that the requested outgoing communication can be admitted or not, in a following step 304, e.g. by sending a service request notification signal S from the activated service application 204 to the communication admission controller 206 as shown in FIG. 2.

If it is determined in a next step 306 that the requested outgoing communication cannot be admitted according to the communication admission rules, the communication is rejected in a further step 308, e.g. by displaying a suitable reject message on display unit 208 shown in FIG. 2. On the other hand, if it is determined in step 306 that the requested outgoing communication can be admitted, a communication request message is sent from the terminal towards a used communication services network in a final step 310, to initiate the communication. For example, the communication request unit 210 shown in FIG. 2 may be activated to send the communication request message to the network, which will be the first message issued from the terminal to the network in this procedure. If the communication request is not admitted according to step 308, no signal or message is sent out from the terminal, thereby not impacting or consuming any communication resources whatsoever outside the terminal.

Figure 4:
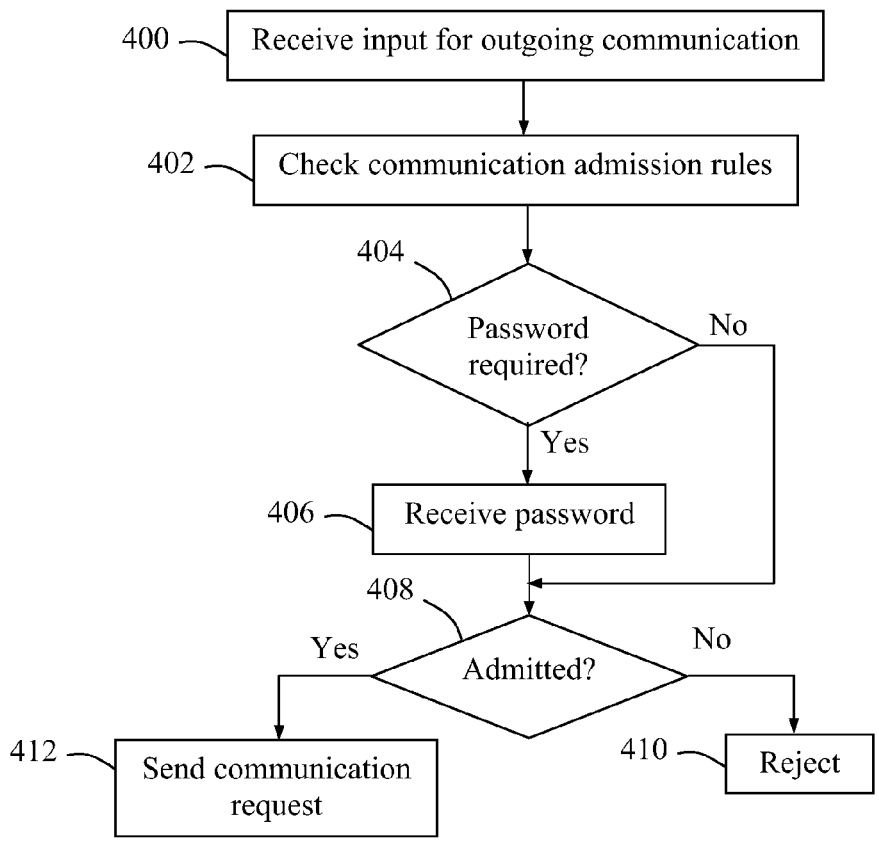
FIG. 4 is a flow chart illustrating an alternative procedure for controlling the admission of outgoing communications, in accordance with yet another embodiment.

FIG. 4 illustrates steps in a somewhat modified procedure for controlling the admission of outgoing communications, as performed by a user terminal in accordance with yet another embodiment involving the use of passwords. In this figure, it is assumed that communication admission rules have already been created in a configuring procedure, as described for step 300 above. In a first step 400, an input command for an outgoing communication is received from a current terminal user, and the communication admission rules are then checked in a next step 402 to find out if the requested outgoing communication can be admitted or not, just as described for respective steps 302 and 304 above.

In this example, it is also determined in a further step 404 whether a password is required for the requested communication according to the communication admission rules. A correct password may be required depending on any one or more of: identity of current terminal user, type of requested communication service, type of requested media, time of day, week or season, identity of called user, location of current user, and location of called user, and so forth. For example, one particular type of communication service may be admitted without a password, e.g. messaging, while another service type may require a correct password, e.g. voice calls or video telephony.

If required, a password is received from the current user in a next step 406, after prompting the user in a suitable manner to enter the password. If no password is required in step 404, step 406 will naturally be omitted, as indicated in the figure. It is then generally determined if the requested communication can be allowed in a step 408, e.g. depending on the communication admission rules and/or whether the entered password was correct or not. If the requested outgoing communication cannot be admitted in step 408, the communication is rejected in a step 410, otherwise a communication request message is sent from the terminal towards the used network in a step 412, to initiate the communication.

This solution is implemented solely in the user terminal, and no functionality whatsoever is required in any network node, such as an IMS-AS or a session control node, to accomplish the above-described admission control of outgoing communications. Furthermore, no signals or messages are issued from the terminal towards the used communication network until the outgoing communication has been admitted. If not admitted, no communication resources whatsoever outside the terminal are impacted or consumed. By having this solution implemented locally in the terminal, it will become more attractive to any companies, enterprises or families sharing such a terminal. As a result, the sales thereof may be enhanced.

While the invention has been described with reference to specific exemplary embodiments, the description is in general only intended to illustrate the inventive concept and should not be taken as limiting the scope of the invention. The present invention is generally defined by the following independent claims.

The invention claimed is:

1. A method in a user terminal of controlling the admission of outgoing communications, comprising the following steps:
    creating one or more communication admission rules locally in the terminal according to configuring input commands dictating when outgoing communications should be admitted or rejected, wherein the communication admission rules require a correct password from the current user before allowing an approved outgoing communication,
    receiving an input request from a current terminal user for an outgoing communication,
    checking said communication admission rules in response to the received input request, and
    sending a communication request message towards a used communication services network if the requested outgoing communication is approved and can be admitted according to the communication admission rules and the user has entered he correct password, otherwise providing a reject message to the current terminal user if the requested outgoing communication cannot be admitted.

2. A method according to claim 1, wherein said communication admission rules are based on any of the following limitation factors separately or in combination: identity of current terminal user, location of current user, type of requested communication service, type of requested media, time of day, week or season, identity of called user, and location of called user.

3. A method according to claim 1, wherein the communication admission rules dictate that said password is required depending on any one or more of: identity of current terminal user, type of requested communication service, type of requested media, time of day, week or season, identity of called user, location of current user, and location of called user.

4. A method according to claim 1, wherein a service application in the terminal is activated by said input request and a communication admission controller in the terminal then receives a service request notification signal from the service application in order to check said communication admission rules.

5. A method according to claim 1, wherein the requested outgoing communication involves any of: a voice call, a media session, messaging and/or an IMS transaction.

6. An apparatus in a user terminal for controlling the admission of outgoing communications, comprising:
    a communication admission controller configured to create one or more communication admission rules locally in the terminal according to configuring input commands dictating when outgoing communication requests should be admitted or rejected, wherein the communication admission rules require a correct password from the current user before allowing an approved outgoing communication,
    an input unit configured to receive an input request from a current terminal user for an outgoing communication, wherein the communication admission controller is further configured to check said communication admission rules in response to the received input request, and
    a communication request unit configured to send a communication request message towards a used communication services network if the requested outgoing communication is approved and can be admitted according to the communication admission rules and the user has entered the correct password, wherein the communication admission controller is further configured to otherwise provide a reject message to the current terminal user if the requested outgoing communication cannot be admitted.

7. An apparatus according to claim 6, wherein said communication admission rules are based on any of the following limitation factors separately or in combination: identity of current terminal user, location of current user, type of requested communication service, type of requested media, time of day, week or season, identity of called user, and location of called user.

8. An apparatus according to claim 6, wherein the communication admission rules dictate that said password is required depending on any one or more of: identity of current terminal user, type of requested communication service, type of requested media, time of day, week or season, identity of called user, location of current user, and location of called user.

9. An apparatus according to claim 6, wherein the communication admission controller is further configured to check said communication admission rules in response to a service request notification signal provided from a service application in the terminal when the service application is activated by said input request.

10. An apparatus according to claim 6, wherein the requested outgoing communication involves any of: a voice call, a media session, messaging and/or an IMS transaction.

* * * * *

UNITED STATES PATENT AND TRADEMARK OFFICE
CERTIFICATE OF CORRECTION

PATENT NO. : 8,824,479 B2  Page 1 of 1
APPLICATION NO. : 13/129013
DATED : September 2, 2014
INVENTOR(S) : Stille It is certified that error appears in the above-identified patent and that said Letters Patent is hereby corrected as shown below:

In the Claims

In Column 7, Line 45, in Claim 1, delete "entered he" and insert -- entered the --, therefor.

Signed and Sealed this
Twenty-eighth Day of April, 2015

Michelle K. Lee
*Director of the United States Patent and Trademark Office*